US012111890B2

(12) United States Patent
Buda et al.

(10) Patent No.: US 12,111,890 B2
(45) Date of Patent: Oct. 8, 2024

(54) DETECTING ABNORMAL HUMAN BEHAVIOR BY USING DATA FROM USER'S PORTABLE DEVICES

(71) Applicant: KOA HEALTH DIGITAL SOLUTIONS S.L.U., Barcelona (ES)

(72) Inventors: Teodora Sandra Buda, Barcelona (ES); Iñaki Estella Aguerri, Barcelona (ES); Mohammed Khwaja, Bangalore (IN); Roger Garriga Calleja, Barcelona (ES); Aleksandar Matic, Lloret de Mar (ES)

(73) Assignee: KOA HEALTH DIGITAL SOLUTIONS S.L.U., Barcelona (ES)

( * ) Notice: Subject to any disclaimer, the term of this patent is extended or adjusted under 35 U.S.C. 154(b) by 356 days.

(21) Appl. No.: 17/540,853

(22) Filed: Dec. 2, 2021

(65) Prior Publication Data

US 2022/0095081 A1    Mar. 24, 2022

Related U.S. Application Data

(63) Continuation-in-part of application No. PCT/EP2020/085724, filed on Dec. 11, 2020.

(30) Foreign Application Priority Data

Dec. 11, 2019  (EP) .................................... 19383093

(51) Int. Cl.
*G06F 18/2433* (2023.01)
*H04W 4/029* (2018.01)

(52) U.S. Cl.
CPC ........ *G06F 18/2433* (2023.01); *H04W 4/029* (2018.02)

(58) Field of Classification Search
CPC ........................... G06F 18/2433; H04W 4/029
(Continued)

(56) References Cited

U.S. PATENT DOCUMENTS

| 7,202,791 B2 | 4/2007 | Trajkovic | G08B 23/00 340/573.1 |
| 8,606,497 B2 | 12/2013 | Doherty et al. | G01C 21/00 701/400 |

(Continued)

OTHER PUBLICATIONS

Tâm Huynh et al, "Discovery of activity patterns using topic models", 10th International Conference on Ubiquitous Computing (Ubicomp 2008) ; Seoul, Korea; Sep. 21-24, 2008, ACM, New York, NY, USA, (Sep. 21, 2008), doi: 10.1145/1409635.1409638, ISBN 978-1-60558-136-1, pp. 10-19, XP058272589.

(Continued)

*Primary Examiner* — Ted M Wang
(74) *Attorney, Agent, or Firm* — MARSHALL, GERSTEIN & BORUN LLP

(57) ABSTRACT

A method for detecting abnormal behavior involves constructing words and text documents based on data acquired from mobile phone sensors during defined time intervals. The time intervals are defined based on data from mobile phone sensors indicative of usage patterns of the mobile phone user. Words are constructed for each time interval as a vector including the time interval and sensor-based feature levels. Each sensor-based feature level is mapped to a range of values of a sensor-based feature that are extracted from the sensor data. The text document is constructed from the words based on the time intervals and the sensor-based feature levels. A current routine for each time interval is determined using topic modeling based on the words that most frequently appear in the text document. An alert is generated if the current routine for any time interval deviates from a past routine for a corresponding past time interval.

19 Claims, 7 Drawing Sheets

(58) Field of Classification Search
USPC .................................................... 455/456.3
See application file for complete search history.

(56) References Cited

U.S. PATENT DOCUMENTS

| | | | | |
|---|---|---|---|---|
| 2009/0195401 A1* | 8/2009 | Maroney | ................ | G06V 20/52 |
| | | | | 340/686.6 |
| 2015/0213702 A1* | 7/2015 | Kimmel | ................ | G06V 20/52 |
| | | | | 382/103 |
| 2019/0246968 A1 | 8/2019 | Matic et al. | ............. | A61B 5/16 |

OTHER PUBLICATIONS

Federico Castanedo et al, "Learning routines over long-term sensor data using topic models", Expert Systems., GB, (May 29, 2013), vol. 31, No. 4, doi: 10.1111/exsy.12033, ISSN 0266-4720, pp. 365-377, XP055285342.

Nabaei Boshra et al, "Activity monitoring using topic models", 2016 IEEE Conference on Intelligence and Security Informatics (ISI) , IEEE, (Sep. 28, 2016) , doi:10.1109/ISI.2016.7745453, pp. 115-120, XP033005766.

International Search Report dated Mar. 4, 2021, from the European Patent Office in the priority International Patent Application PCT/EP2020/085724 (7 pages).

* cited by examiner

| WORD | INDEX |
|---|---|
| < $t_1$, L, M, M, H, ..., M> | 0 |
| < $t_1$, M, L, H, M, ..., L> | 1 |
| < $t_2$, L, M, M, H, ..., L> | 2 |
| ... | |
| < $t_m$, M, H, ..., L> | N_w |

DICTIONARY CREATION FOR DOCUMENT $d_k$

FIG. 7

DETECTING ABNORMAL HUMAN BEHAVIOR BY USING DATA FROM USER'S PORTABLE DEVICES

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2020/085724, filed on Dec. 11, 2020, and published as WO 2021/116384 A1 on Jun. 17, 2021, which in turn claims priority from European Application No. EP 19383093.2, filed in the European Patent Office on Dec. 11, 2019. This application is a continuation-in-part of International Application No. PCT/EP2020/085724, which is a continuation of European Application No. EP 19383093.2. International Application No. PCT/EP2020/085724 is pending as of the filing date of this application, and the United States is an elected state in International Application No. PCT/EP2020/085724. This application claims the benefit under 35 U.S.C. § 119 from European Application No. EP 19383093.2. The disclosure of each of the foregoing documents is incorporated herein by reference.

TECHNICAL FIELD

The present invention has its application within the information and communications technology sector and, more specifically, relates to the deployment of tools that use data measurements from users' portable devices (e.g., applications in mobile user terminals such as smartphones or tablets, and wearable user devices such as smartwatches, etc.) for detecting users' deviant behavior.

More particularly, the present invention refers to a system and method for extracting behavior routines based on the processing of sensor data and active data and using topic modeling, and generating alerts based on deviations of actuals from the extracted routines. The system can work systematically with a therapist and/or a user/patient to improve his/her mental health.

BACKGROUND

People's routines can vary significantly in terms of movement, socializing and locations visited and in general they are much influenced by their working shifts and hours.

In existing systems that track people's routines for mental health applications using smartphones, basic statistical information derived from the distribution of mobile sensing data is used to determine these routines. While this was a great start to obtain routines passively from smartphone data, without the use of direct user input, such as diaries, the statistical information is too simplified to derive a complex user entity, such as routines for the detection of deviant behavior. Recent methods use contexts, such as time of the day and also extract more complex features, such as circadian rhythms and regularity indices, to approximate real world behavior and contexts through which better routines can be derived. However, such methods fail to use the wide array of formidable mathematical tools that can help to achieve a closer and more accurate approximation of the user's routine.

Moreover, understanding when an alert should be provided by observing deviant behavior has been done in a simplistic manner. Existing methods establish a threshold based on statistics and check when an extracted feature significantly exceeds this value.

An example of a method and apparatus for modeling behavior using a probability distribution function is disclosed in U.S. Pat. No. 7,202,791 B2. In this system, behavior (in particular, activities) of an individual are modeled using the probability distribution functions of sensing modalities. Using basic thresholds, obtained from the statistics of the distribution function, the system flags if the user is engaged in a deviant behavior that departs from the user's consistent/normal state of behavior. An alert is established when deviant behavior occurs. This system uses basic statistics to establish regular routines of behavior. Routines are significantly complex behaviors that are dependent on many factors, and basic statistics of sensing measurements cannot represent human routines accurately. This system's estimation of deviation behavior is also simplistic and relies on the same statistical information.

U.S. Pat. No. 8,606,497 B2 discloses a method for detecting and monitoring human activity utilizing location data. This is a basic method that is used to infer a person's engagement in an activity based on the person's location and time context. The method extracts a user's activity pattern over space and time using location data obtained from a personal communication device (mobile phones). This method obtains features from the GPS data to establish a location and time context used to derive a person's engagement in a certain activity, but it does not establish any routine that the user follows or how the person's behavior can deviate.

The article "Trajectories of depression: unobtrusive monitoring of depressive states by means of smartphone mobility traces analysis" by L. Canzian et al. (Proceedings of the 2015 ACM international joint conference on pervasive and ubiquitous computing, pp. 1293-1304, ACM, September 2015) describes how smartphones can be used unobtrusively to monitor a user's depressive states. The method obtains various features engineered from smartphone sensing data related to this purpose. One of these features is called routine index and is extracted from location data. This feature compares the number of locations visited by a user during a given time instance against the number of features visited by the same user during other time instances of the same interval. This is a clever way of establishing how regular the user is in his/her location patterns, and thus creates a routine of sorts. However, this method uses only location data and cannot be applied to other features or locations together with other sensing data. Canzian et al. do not provide the ability to use multiple sensing modalities. Canzian et al. use a single index that defines the user's routine but cannot obtain more in-depth features.

The article "Sensing behavioral change over time: Using within-person variability features from mobile sensing to predict personality traits" by W. Wang et al. (Proceedings of the ACM on Interactive, Mobile, Wearable and Ubiquitous Technologies, 2(3), page 141, 2018) also uses time slots and obtains features within each slot to create a single feature like the regularity index. This paper looks at differences in sensing data within each person to create features (standard deviation, regularity index) that relate to the person's routines. The regularity index is obtained using the cross-correlation of hourly sensing data over two-day pairs. This is then aggregated to obtain how regular the aggregate sensing features of a user are, which describes how regularly a user behaves.

The article "The Social Rhythm Metric: An instrument to quantify the daily rhythms of life" by T. K. Monk et al.

(Journal of Nervous and Mental Disease, 1990) describes a psychometric instrument for obtaining the routines and rhythms of a person's life, using a self-reported questionnaire. This method has been used by the psychological community to help users tackle behavior that that contradicts their routines. However, such methods are not popular with users. While accurate, questionnaires like these are extremely tedious for a user to complete everyday. The pervasiveness of smartphones allows us to tackle this problem head on and not be a nuisance to users.

Therefore, there is a need in the state of the art for providing a personalized detection of abnormal human behavior related to clinical conditions using measurements from the user's smartphone and/or other portable device and/or wearable device.

SUMMARY

A system for detecting abnormal human behavior includes data preprocessing 110, routine extraction 120 and an alert mechanism 130. The data preprocessing 110 involves defining time intervals 111, constructing words 112, and constructing a document 113. Time intervals 111 are defined for a user by extracting the time intervals 103 based on historical data from the sensors 101 and personalizing the intervals based on active data 102 input by the user or inferred data from the sensors 101. Words are constructed 112 for each interval as a vector comprising a plurality of sensor-based feature levels that are mapped to a range of values of a sensor-based feature extracted from historical and real-time sensor data 101. A document is constructed 113 with the words based on the defined intervals and the mapped sensor-based feature levels. After the data preprocessing 110, behavior routines are extracted 120 for each time interval by extracting the most frequent words using topic modeling. If a deviation is detected between the sensor-based features extracted in a current time interval and a past routine extracted for a past time interval previous to the current time interval, then an alert is generated 130.

A method for detecting abnormal human behavior involves constructing words and text documents based on data acquired from sensors on a mobile phone of a user during defined time intervals. The time intervals applicable to the user are defined based on data from the sensors on the mobile phone indicative of usage patterns of the mobile phone by the user. Words are constructed for each of the time intervals. Each word is a vector that includes a time interval and a plurality of sensor-based feature levels. Each of the sensor-based feature levels is mapped to a range of values of a sensor-based feature that are extracted from the data from the sensors. The text document is constructed from the words based on the time intervals and the sensor-based feature levels. The text document is constructed by grouping the words constructed from data that was acquired, for example, during a particular day of the week, during a particular day and during a particular one of the time intervals, or during a predetermined type of day and during the particular one of the time intervals. A current routine for each of the time intervals is identified by extracting the words that most frequently appear in the text document using topic modeling. In one embodiment, the topic modeling involves Latent Dirichlet Allocation (LDA). The identified current routine is characterized by the sensor-based feature levels associated with each frequently appearing word. An alert is generated if the current routine for any of the time intervals deviates from a past routine determined based on a corresponding past time interval.

Examples of the sensor-based feature include the percentage of time that the user spends at a particular location, the percentage of battery power of the mobile phone consumed per minute, the number of steps taken by the user per minute as sensed by the mobile phone, and the average ambient light level determined using the sensors. Each of the sensor-based feature levels is mapped to the values of the sensor-based feature based on the values of the sensor-based feature computed during each of the time intervals, and a value of the sensor-based feature during a current time interval is compared to the values of the sensor-based feature associated with the remainder of the time intervals.

In another embodiment, a system for detecting abnormal human behavior includes a memory that stores computer-readable code, a processor operatively coupled to the memory, and a graphical user interface. The processor is configured to implement the computer-readable code by defining time intervals, personalizing the time intervals, constructing words and text documents, extracting routines and generating an alert if abnormal behavior is detected. The time intervals applicable to a user are defined based on historical data from sensors. The time intervals are personalized based on data actively input by the user or based on real-time data from the sensors.

Words are constructed for each of the time intervals. Each word is constructed as a vector that includes one of the time intervals and a plurality of sensor-based feature levels. Each of the sensor-based feature levels is mapped to a range of values of a sensor-based feature that are extracted from the data from the sensors. A text document is constructed from the words based on the time intervals and the sensor-based feature levels. Routines are extracted for each of the time intervals by extracting the words that most frequently appear in the text document using topic modeling to obtain a routine vector. An alert is generated if the sensor-based feature extracted in a current time interval deviates from a past routine extracted for a past time interval prior to the current time interval. The user is presented with a visualization of the alert, the routine vector, the time intervals, and the historical data on the graphical user interface.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

FIG. 7 is an exemplary table listing the set of unique words in all documents indexed consecutively.

DETAILED DESCRIPTION

Figure 1:
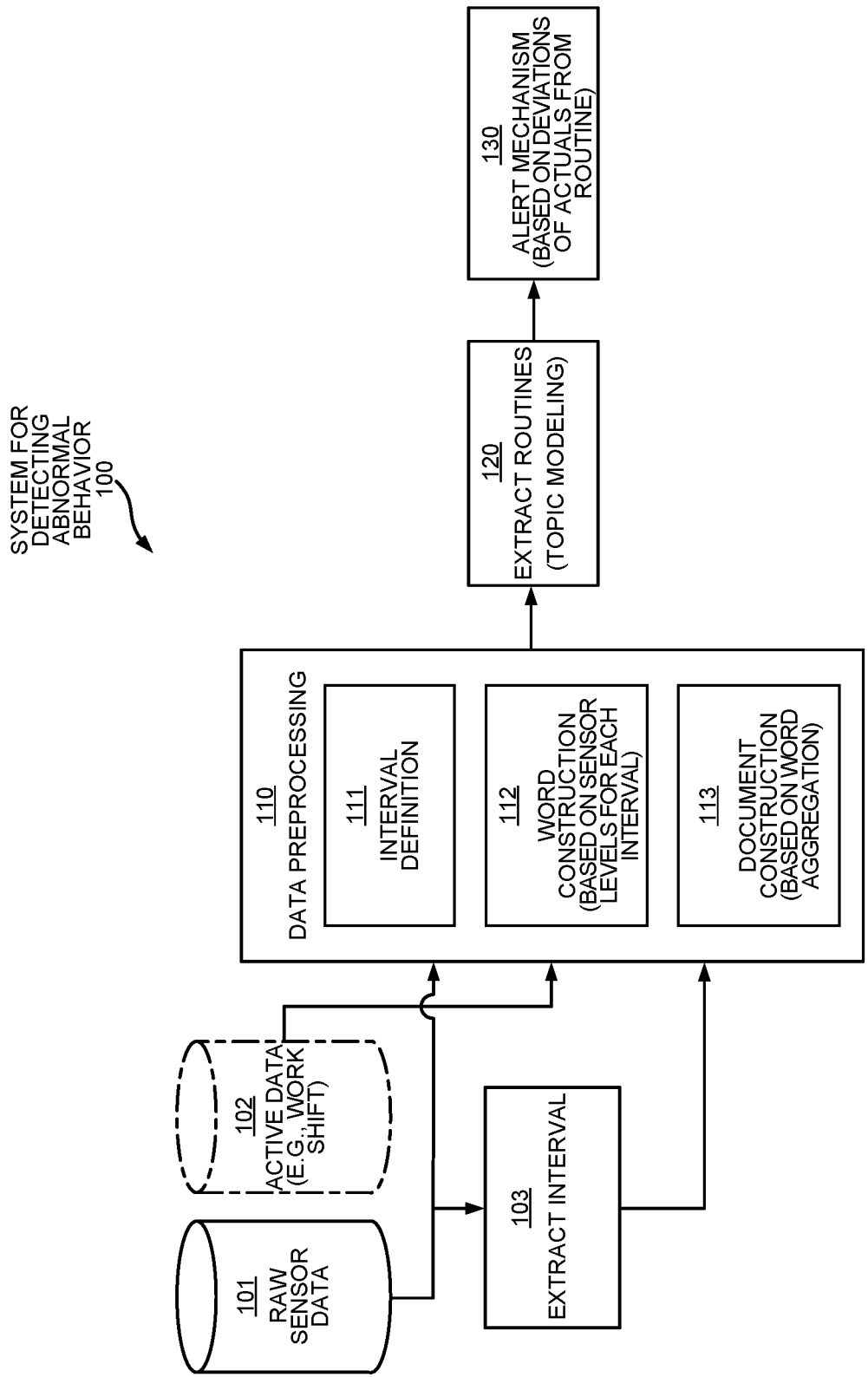
FIG. 1 shows a block diagram of the system architecture of a possible embodiment of the invention.

Reference will now be made in detail to some embodiments of the invention, examples of which are illustrated in the accompanying drawings.

The novel method solves the aforementioned problems and overcomes previously explained state-of-art work limitations by providing a method for extracting a user's routine automatically from measurements obtained by the mobile phone and wearables of each individual in a way that is personalized to the user's work shifts. The method defines ranges of low, medium and high for each measurement and generates documents where each word represents the time slot and sensor-based feature levels for that time slot. The method obtains personalized time slots for each user based on the user's past mobile usage patterns and active data information. Furthermore, through topic modeling, the most frequent topics are computed, and thus the routines are automatically extracted based on previously defined time slots and measurement levels. Furthermore, the system computes deviations from the routine and alerts the user when these deviations are sufficiently large, suggesting that the user has deviated from the user's expected routine. This alert can be used by a clinician as an indication that a check up is due.

The novel method can be applied to clinical systems so that the clinician can be aided by a dashboard of the routine of the user and the user's historical alerts, receiving automated alerts without the need for continuously monitoring and visualizing dashboards of the user's data. Furthermore, the novel method can be applied to sub-clinical envisioned systems where stress, depression and/or anxiety are being measured, and the routines extracted from the user's data can shed some light on why the user's level is particularly high or low depending on the user's extracted routine.

The novel method takes into account various contexts about the users, including whether the users are working or not working, whether they are at home or not, whether the sensing data was obtained during the week or over the weekend, etc., to name but a few examples. Using these contexts, a smart data multiplexing method is proposed to extract sensor-based feature levels in these time slots and to construct words and documents. Subsequently, topic modeling, which is a robust method for context estimation and data mining, is used to extract routines.

Routines: The proposed method first automatically extracts routines from a user's data by using topic modeling for extracting the most frequent topics and keywords from a set of words constructed artificially based on the measurement levels. None of the existing systems considers forming words with measurement levels. Moreover, the novel method goes beyond the standard state of the art where topic modeling has been applied to location for mobility patterns, as it constructs novel keywords by capturing a combination of personalized time slot allocation and different sensor-based feature levels, tailored to the user's distribution of past values. Moreover, the method goes beyond aggregated measures, such as mean and standard deviation and routine indexes that are most commonly found in the literature, by automatically extracting the routine through most frequent sensor level detection within a time slot defined personal to the user.

Alerting: The novel method generates alerts when a significant deviation occurs from the routine extracted in the current data. This deviation takes into account, through weights, the correlation of the measurements with the target feature (e.g., depression level) and also the distance from the routine level (e.g., noise level currently is high compared to low in the routine). None of the existing systems takes into consideration such computations in the alert mechanisms. Moreover, multiple weight vectors can be added, allowing the alert mechanism to have personalized and tuned alerts for each condition monitored (e.g., depression, anxiety, wellbeing measures, etc.).

A first embodiment involves a computer-program-implemented method for detecting abnormal human behavior, comprising the following steps:

data pre-processing which comprises:
defining time intervals for a user by extracting time intervals based on historical raw data from sensors and personalizing the extracted time intervals based on active data input by the user or inferred raw data from the sensors;
constructing words for each defined time interval, wherein a word is constructed as a vector comprising the defined time interval and a plurality of sensor-based feature levels, a sensor-based feature level being mapped to a range of values of a sensor-based feature extracted from historical and real-time sensor data;
constructing a text document with the constructed words based on the defined time intervals and the mapped sensor-based feature levels;
extracting routines for each defined time interval by extracting the most frequent words from the constructed documents using topic modeling to obtain a routine vector; and
triggering an alert involving displaying the alert 428, 605 if a deviation is detected between the sensor-based features extracted in a current time interval and a past routine extracted for a past time interval prior to the current time interval.

A second embodiment involves a processing system configured to implement the method described above.

The method and system in accordance with the above described aspects of the invention has a number of advantages with respect to the aforementioned prior art, which can be summarized as follows:

None of the existing techniques combines measurement levels with topic modeling for deriving new insights into a user's routines and for alerting when deviations from these routines are significant, making the novel method of detecting deviant behavior more robust and allowing the alerting mechanism to be tuned for multiple conditions.

While existing techniques use basic statistics from sensing data, along with basic time contextualization, and create alerts using simple estimations based on distribution statistics, the novel method for extracting routines significantly improves over the state of the art as a complex understanding of routines is established. Also, the method goes beyond the state of the art in triggering alarms by understanding how much each item of sensed information is related to the output variable, as it uses a combination of weighted distances from the calculated routines to trigger alarms.

Personalization is a key advantage of the novel method because knowing the user's routines enables a clinician to obtain relevant information about the user's clinical conditions as follows:

the correct time to intervene with targeted interventions:
i) based on location (at home, work or outdoor), ii) based on deviations (e.g., a check-up from the clinician when the deviation exceeds the normal amount);

insights to the user, coupled with the user's stress, depression and/or anxiety levels, observing which routines are helpful for reducing the user's symptoms.

The novel method/system does not rely on raw sensor values, but rather on levels that enable it to be ported to different products with minor adjustments.

The embodiments of the invention can be implemented in a variety of architectural platforms, operating and server systems, devices, systems, and applications. Any particular architectural layout or implementation presented herein is provided for purposes of illustration and comprehension only and is not intended to limit aspects of the invention.

FIG. 1 shows an overview of the system architecture of a system 100 for detecting abnormal behavior, according to a preferred embodiment, where the main blocks are: data preprocessing 110, routines extraction 120 and alert generation 130.

The system uses raw sensor data 101 acquired from different input data sources:

Mobile phone sensors (e.g., screen unlock, accelerometer, light, noise, steps, GPS, battery, etc.) from which additional measurements can be derived (e.g., number of steps, number of locations visited, noise level exposed to, light level, battery consumed, etc.). Some of these can be proxies for health-related measurements, for instance time spent at home is considered a proxy for social isolation looking at social anxiety and other clinical models.

Wearables sensors (e.g., PPG, EDA, thermometer), from which physiological measurements and biomarkers can be derived (e.g., heart rate, heart rate variability, blood pressure, temperature, etc.).

The measurements extracted from raw sensor data can also be referred to as sensor-based features or simply features, a common term used in machine learning for referring to input and target variables.

In addition, the system 100 uses the active data 102 as input, i.e., data that the user inputs manually, such as the user's work shift and personality through active forms/questionnaires.

In further detail, the system blocks depicted in FIG. 1 perform the following steps of a method for detecting abnormal behavior.

Data Preprocessing 110:
a. Interval definition 111: Firstly, the method determines the relevant time intervals or slots, taking into consideration typical country routines or specific user routines in a way that is personalized to the user. For personalization, a) a user's active data 102 can be acquired through a questionnaire to specify the user's working hours and typical home hours, or b) a machine learning-based approach captures raw sensor data 101 related to the work, outdoor activities, home (i.e., location categories) that is used to infer how the user spends time and thus defines the relevant time intervals in a personalized manner.
b. Word construction 112: Further, data is split based on the time slots determined from the previous step of interval definition 111, either using active data 102 input by the user or inferred from the raw sensor data 101.

Based on the raw sensor data captured during a defined time slot, the method computes aggregations of sensor-based features (e.g., steps sum) and, based on their distributions, the method maps ranges of values into different levels for each sensor-based feature, for example: low, medium and high levels.

The sensor feature levels can be expanded into more categories, depending on the quality of the raw sensor data.

Furthermore, based on the sensor feature level, a word is constructed as a tuple<time slot, feature_1_level, . . . , feature_n_level>; feature_i_level being in {H, M, L}, where L stands for Low, M for Medium, and H for High, and i=1, 2, . . . , n, where n represents the number of features built based on the sensor raw values.

Figure 2:
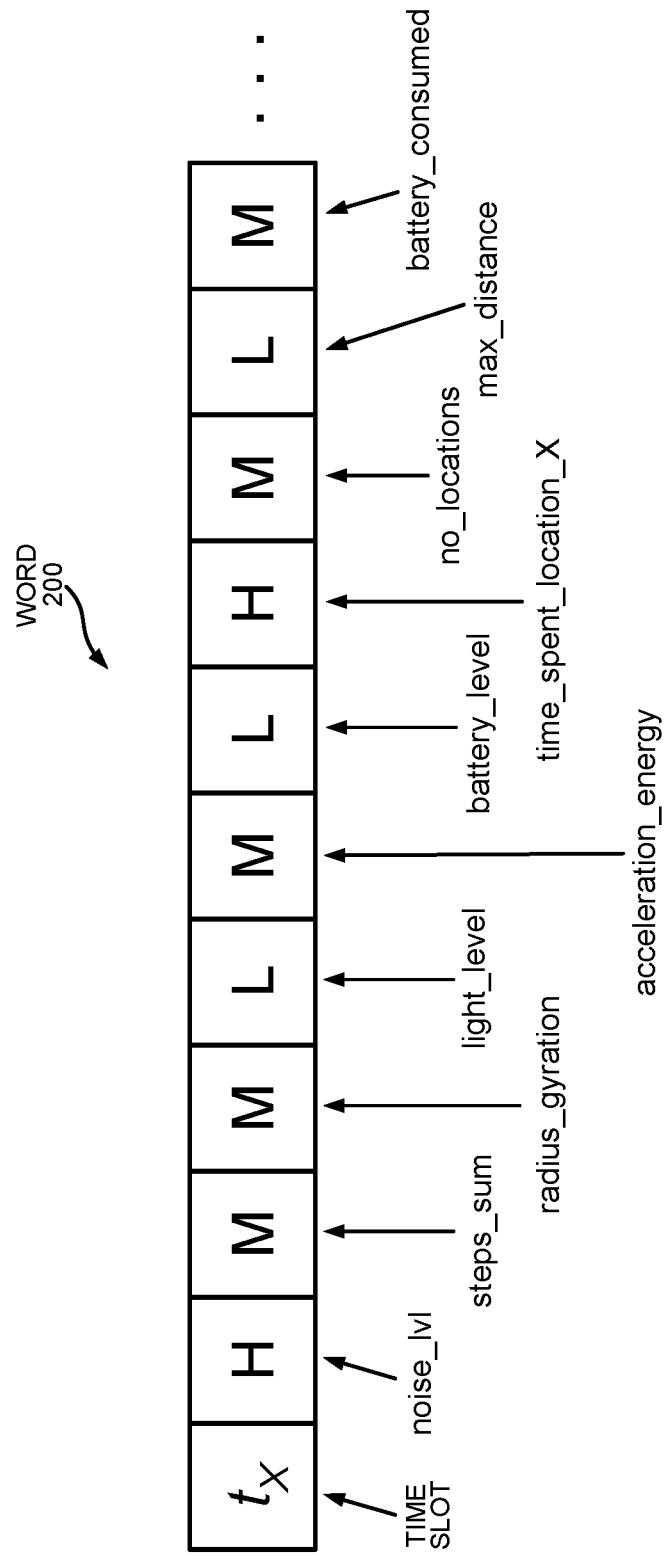
FIG. 2 shows a schematic representation of an output dashboard of results provided by the system.

An example of such a word 200 is shown in FIG. 2. FIG. 2 illustrates an example of the word 200 constructed as a tuple based on a time slot ($t_x$) and the three distinguished sensor feature levels: high level (H), medium level (M) and low level (L). The words follow the same order. For example, in the example shown in FIG. 2, the second letter always represents the level of the noise.

c. Document construction 113: Furthermore, based on the sensor feature levels and time intervals defined, text documents are built based on the words 200 constructed in the previous step.

Routine extraction 120: The time-slot routine is then captured using topic modeling by extracting the most frequent words from the constructed documents.

Alert generation 130: Deviations from time-slot routines can then easily be computed by observing current patterns for the time-slot versus the routine calculated. Thus, the method then detects when there is a deviation from the captured routine and alerts the user when there are irregular patterns. The alert mechanism takes into account both the distance from the routine extracted, and also the weights vector, which represents correlations observed between the target feature (e.g., anxiety level, depression level, well-being score) and the sensor-based features.

Figure 3:
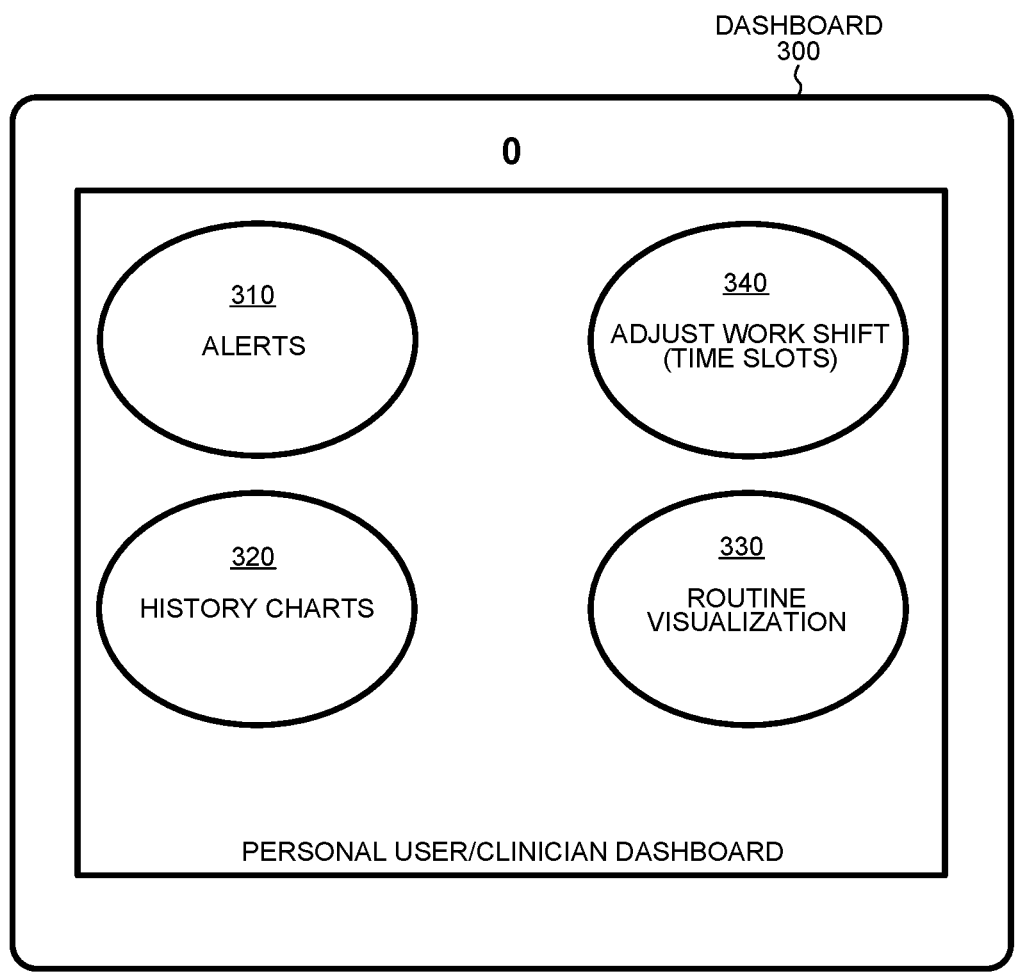
FIG. 3 shows an example of a word constructed by the system based on time slot and sensor feature levels.

A system dashboard 300 that presents the results output by the novel system is depicted in FIG. 3, where the alerts 310, history charts 320, routines 330 can be visualized, and different time-slot separations can be set or configured 340 by the end user. Moreover, the information extracted on a user's routine can be constantly provided to the user through the display on his/her portable devices (smartphones, tablet, smartwatch etc.) so that the user can also monitor his/her daily behavior. This personal monitoring can persuade the user to change her behavior so that she can stay within the range of her regular routine behavior. Additionally, alerts can be provided by beeps on the user's portable and wearable devices or change in regular user interface during exceptional situations, or by using any other (visible, audible, . . . ) means for notifying/presenting the alerts to the end user. This alert presentation on the user's devices triggers the user to alter the user's behavior significantly.

Figure 4:
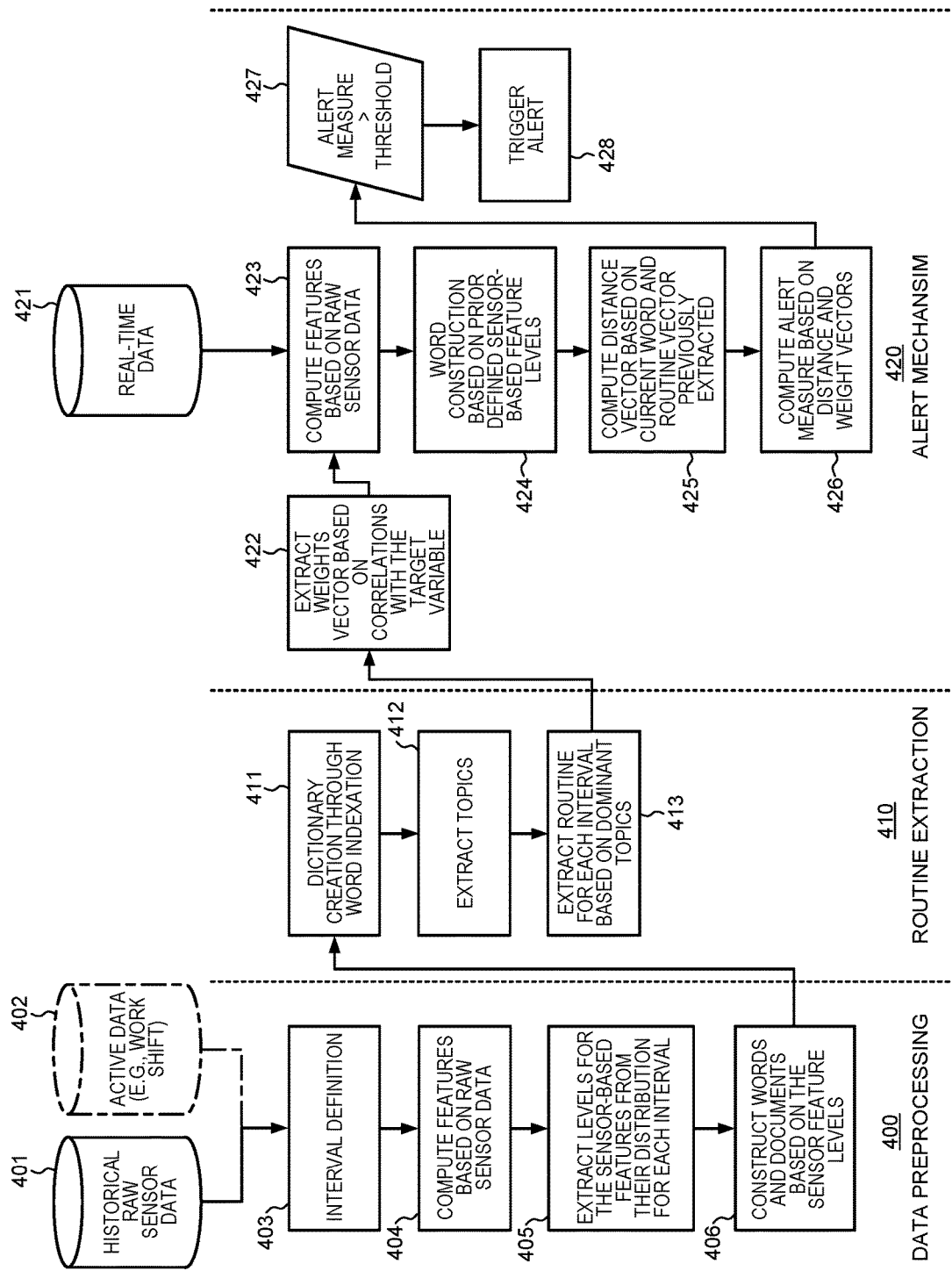
FIG. 4 shows a flow diagram of a system according to a possible embodiment of the invention.

The core blocks of the system architecture, shown in FIG. 1, are described in detail below and illustrated in the flow diagram of the system depicted in FIG. 4.

Data Preprocessing 110, 400: The data preprocessing is applied on a per user basis. The data of each user is processed by applying the aforementioned three steps, a) interval definition 111, b) word construction 112, and c) document construction 113, further detailed below:

Interval Definition 111, 403:

For the user $U_k$, k=1, . . . , K being the number of types of days, Num_type_days, is defined. Each type of day (TD) is divided into $N_{TD}$ non-overlapping intervals. Those intervals are personalised to the users in a way that the intervals are meaningful to them (e.g., taking into account different work shifts). In one embodiment, there are three ways to define the intervals:

i) Based on the country where the user lives (and equal for all users within the country): the typical routines followed in the country where the user is located, obtained from historical raw sensor data 401 are used to define the intervals. For example, each weekday can be divided into three intervals: morning 7 h 00-13 h 00, afternoon 13 h 00-22 h 00 and night 22 h 00-7 h 00.

ii) Personalized per user with active feedback from user: The definition of the time intervals also uses the user's active data 402 input through a questionnaire in which the user indicates how a normal day could be divided; e.g., for user: Monday to Friday, $U_1$ does 0 h-8 h at home, 8 h-9 h commuting, 9 h-17 h working, 17 h-18 h commuting, 18 h-24 h home; on weekends, $U_1$ has the usual splits 0 h-10 h sleeping, 10 h-13 h shopping and housework, 13 h-15 h lunch, 15 h-20 h afternoon at home, 20 h-0 h going out.

iii) Personalized per user with inferred intervals: The system uses a machine-learning algorithm to derive the usual routines of the user, e.g., based on location by capturing when the user is normally static at the same area (applying a clustering technique based on time and location) and when the user typically transitions between areas. This approach can be used automatically to define relevant intervals of time that are user specific.

Word Construction 112:

The word construction process includes two main steps: 1) feature computation 404, and 2) discretization by assigning levels 405 to the computed features for the construction 406 of the words and the documents with these words.

1) Feature Computation 404:

Once the specific intervals are defined for each user, for user k, the system computes S features per interval and day as aggregations of the sensor data, denoted by $(F_{k, i, d, 1}, \ldots, F_{k, i, d, S})$ for interval i and day d. Examples of aggregated features are: the percentage of time spent that the user spends at a predetermined location, the percentage of battery power consumed per minute, the number of steps taken by the user per minute, and the average ambient light level.

2) Word Construction by Discretization:

Then, the system assigns or extracts 405 a level $L_{F_{k, i, d, s}} \in \{1_{1, s}, 1_{2, s}, \ldots, 1_{L, s}\}$ for each feature $F_{k, i, d, s}$ for interval i, day d and features, based on the value of the feature during that interval and how it compares with the values during the rest of the intervals. For example, the levels can be Low (L), Medium (M) or High (H), and the method to determine the mapping of the feature value to one of these three levels can be as follows:

For each feature $F_{k, i, d, s}$, the empirical distribution of its value is obtained using the values of all the intervals.

Then, $F_{k, i, d, s}$ is below the 33rd percentile, $L_{F_{k, i, d, s}}$=Low. If the value is between the 33rd and 66th percentile, $L_{F_{k, i, d, s}}$=Medium. If the value is above the 66th percentile, $L_{F_{k, i, d, s}}$=High For user k, a given time interval $t_i$ and day d, the construction 502 of the word 500 for the raw sensor feature values 501 is defined as:

$$w_{k,i,d} = >t_i, L_{F_{k,i,d,1}}, L_{F_{k,i,d,2}}, \ldots, L_{F_{k,i,d,S}}<$$

where $L_{F_{k, i, d, s}} \in \{1_{1, s}, 1_{2, s}, \ldots, 1_{L, s}\}$ and $F_{k, i, d, s}, \ldots, F_{k, i, d, S}$ are the S feature values for the time interval i and day d.

Figure 5:
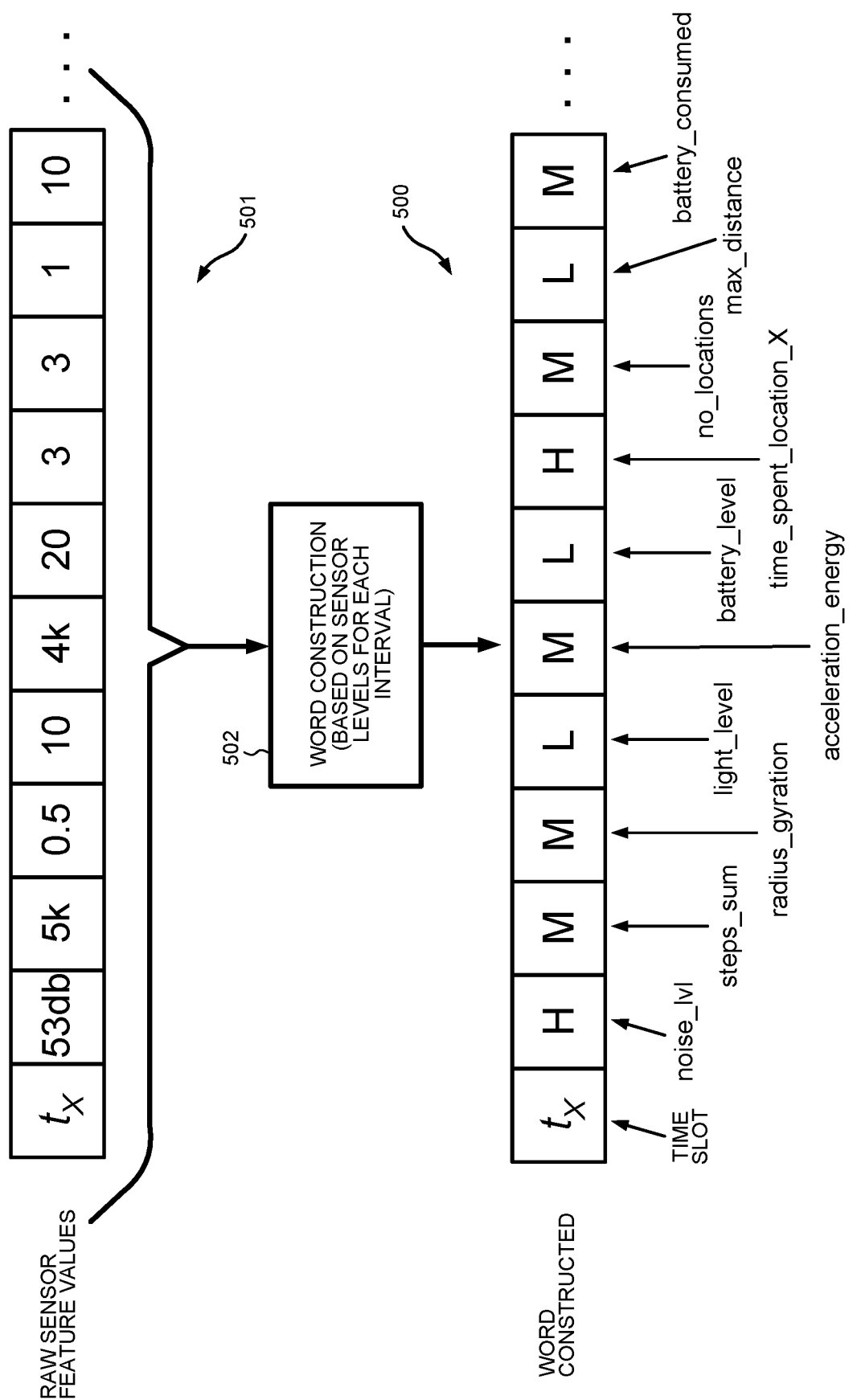
FIG. 5 shows an example of a word constructed by the system based on raw values of the sensor features and levels of the sensor features.

The result of this process is a word vector 500 with the time of the interval ($t_k$) and a level {H, M, L} for each of the features, as shown in the example of FIG. 5, following the three levels mapping of the example described above, i.e., {H, M, L}, where L stands for Low, M for Medium, and H for High. FIG. 5 shows how the word is constructed by the system based on both the raw values of the sensor features and the extracted levels of the sensor features. The order of the features is preserved for each defined interval, so that in the next step of the process the word vectors can be comparable.

Document Construction 113:

The words $w_{k,i,d}$ constructed in the previous step for user k are then grouped together to form N documents denoted as $D_k = \{d_{k,1}, d_{k,2}, \ldots, d_{k,N}\}$. The documents can be created by grouping the words, according to a possible embodiment, in at least one of the following three different ways:

Each document is the sequence of words of a certain day, i.e., a day would be "$<t_i$, L, M, M, H, . . . , M>, $<t_2$, L, M, M, H, . . . , L>, . . . , $<t_m$, M, H, . . . , L>".

Each document is the sequence of words of a certain day of the week during a certain time frame. For example, one document is the sequence of words of all the Mondays during January 2018; another document is the sequence of words of all the Wednesdays during April 2017.

Each document is the sequence of words of a certain type of day during a certain time frame. For example, a document is the sequence of words of all the weekdays during week 34 of 2019.

Routines Extraction 120, 410 Through Topic Modeling:

Once the words and documents $D_k$ are obtained for user k, the time-slot routines are captured using topic modeling by extracting the most frequent words $w_{k,i,d}$ from the documents $D_k$. The output of the topic modeling step is given in terms of a relationship between topics and words in the dictionary, e.g., through a conditional probability distribution.

This can be done with standard topic modeling methods such as Latent Dirichlet Allocation (LDA). LDA can be performed using Bag of Words or using TF-IDF (Term Frequency-Inverse Document Frequency). Topic modeling involves a preprocessing of the data contained in the documents. In one embodiment, the routines extraction 120, 410 is performed by applying LDA with bag of words. The application of this LDA method involves the three steps, 1) dictionary creation, 2) bag of words encoding, and 3) the application of LDA itself, as follows:

1) Dictionary Creation 411:

This step involves indexing the unique words in the documents. For example, it can be done by listing the set of unique words in all documents and indexing them consecutively to create a table as shown in FIG. 7, which is a dictionary creation for document $d_k$.

2) Bag of Words Encoding:

For each document, the words within the document are mapped to the index using the dictionary and the word count or order within the document as [word_idx, word_count]. Alternatively, the TF-IDF score can be considered.

For example, for the document $d_k$ in FIG. 7:

$d_k = \{<t_i$, L, M, M, H, . . . , M>, $<t\_2$, L, M, M, H, . . . , L>, $<t_1$, L, M, M, H, . . . , M> . . . , $<t_m$, M, H, . . . , L>} the following bag of words is encoded:

$BoW_d = \{[0,2], [2,1], \ldots, [N\_w, 1]\}$ where $BoW_d$ denotes the bag of words encoding for the set of pairs [word_idx, word_count] for each word in a document d.

3) Application of LDA to Extract Topics 412:

The LDA method is applied to the bag of words encodings of all the documents $D_k$ of user k. The input to the LDA algorithm is typically the bag of words encodings of $D_k$ and a predefined number of topics T. The LDA algorithm uses dirichlet priors for the document-topic and word-topic distributions to establish a generative model and to fit it to the data. With LDA, the method can extract topics 412 from a document corpus, where each topic Y is human-interpretable and characterized by the words with which it is most strongly associated. The characterization is done in terms of the conditional distribution of each word $w_s$ as it appears in a document d, given that d is of topic Y. For example, using common words instead of those in FIGS. 2 and 5, a "topic 2" is characterized by having a higher probability of generating terms such as "oil, gas, drilling, pipes, Keystone, energy," etc. and not others within the dictionary. In the context of the invention, the topics are the common routines or behaviors characterizing types of days and their relationship with the defined words 200, 500 shown in FIGS. 2 and 5.

The LDA method uses variational inference to fit the predefined generative model, which allows an approximation of the posterior distributions of the model word topic to be characterized using the available data in the corpus.

Furthermore, for a new document $d_j$, the probability of $d_j$ belonging to each topic can be inferred using the characterized conditional probability given the words in $d_j$, e.g., 5% topic 1, 70% topic 2, 10% topic 3, etc.

Based on the dominant topics, the routines of the user are extracted 413 for each defined interval.

Alternatively, other topic modeling methods can be applied, such as LSA (Latent Semantic Analysis), PLSA (Probabilistic Latent Semantic Analysis) and lda2Vec (LDA in Deep Learning).

Alert Generation 420.

The alert mechanism takes into consideration the following two aspects:

i) Distance, d, is computed 425 as the absolute difference between the routine vector and current level vector, where each level is mapped to the following numbers, for example: High level to number 3, Medium to number 2, and Low to number 1. As such, for instance the distance between Low (in routine) and High (in actual) for the noise level is 2. The current level vector, extracted as a word or keyword, is constructed 424 based on the sensor-based feature levels previously defined for each feature computed 423 using the real-time raw sensor data 421.

ii) Weights, w, are computed 422 from the correlation between the sensor-based feature and the target feature (e.g., depression level). Thus, this gives priority to features that are more closely correlated to the target feature (e.g., steps sum, or sleep duration compared to battery level for depression).

Through this, the goals of the alarm generation 420 mechanism are:

Diversity: by utilizing a weights vector per target variable, the system is able to adapt to detect signs of various abnormal conditions by using correlations between the features and target (e.g., anxiety level, depression level, well-being score).

Accuracy: to be more accurate as the routine is captured automatically.

Personalization and granularity: to specify at a much more granular level what part of the user's routine has been affected, in terms of being captured per interval, per individual and per sensor level.

Based on the calculated distance vector and weights vector, the method can determine the features that are most different: steps sum, accelerometer-based energy, time spent at home, etc.

An alert measure a is computed 426 as:

$$a = \Sigma_i^n w_i * d_i$$

where i=1, 2, . . . , n, n representing the number of features built based on the sensor raw values, $w_i$ representing the weight as the correlation between the feature i and the target feature, and $d_i$ representing the distance between the current level and routine level for feature i.

The computed alert measure a is compared with a threshold value 427, such as the average, 75th percentile value etc., and the alerts are raised or triggered 428 when the alert measure a is higher than the threshold value determined (by the system or by the user). The user can label the alert as true or false, and then the system can learn the threshold as it goes. Moreover, the threshold can also be set by the clinician or end user.

Figure 6:
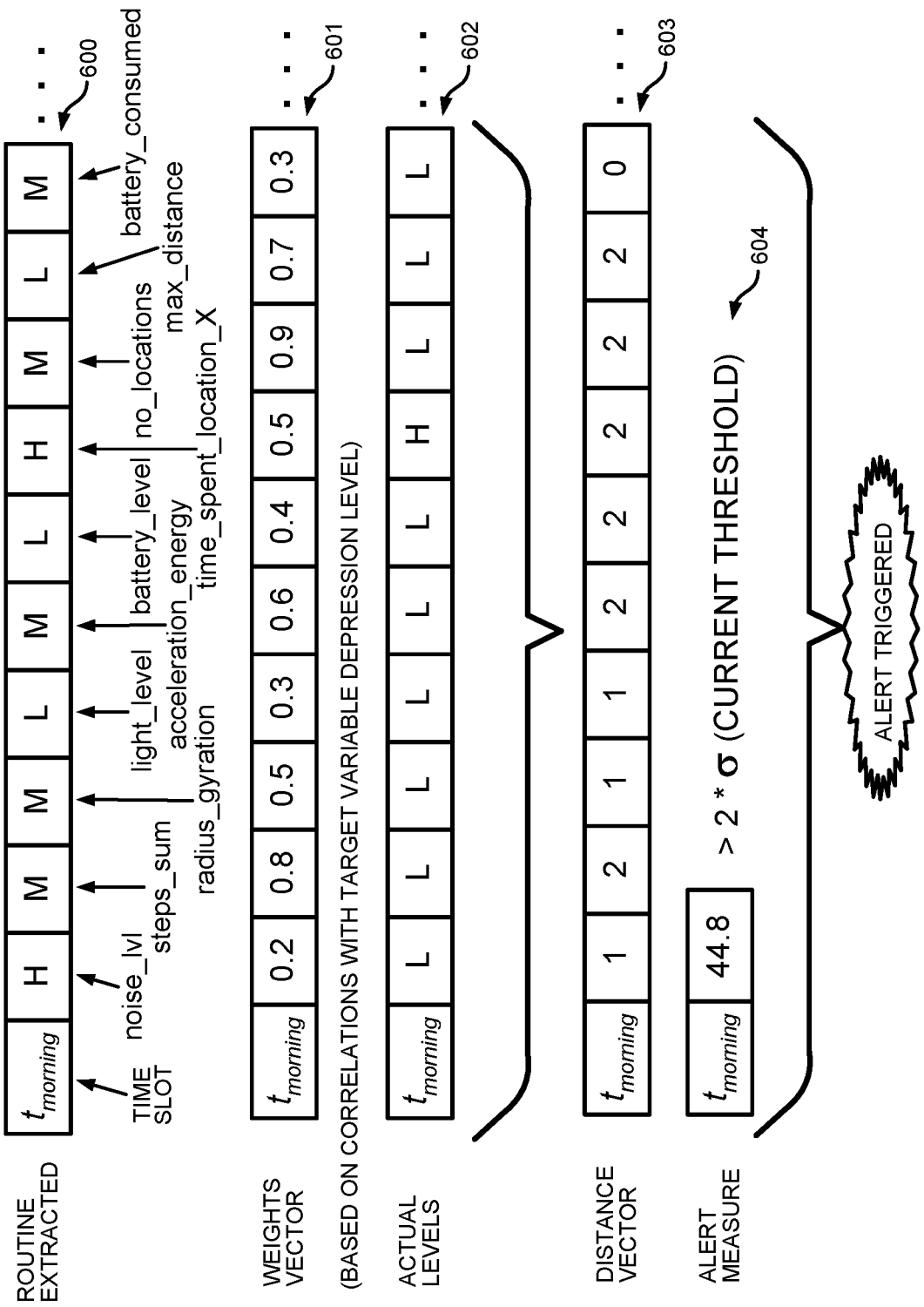
FIG. 6 shows an example of an alarm generation by the system based on a routine extracted as one keyword for a specific time slot.

FIG. 6 shows an example of the alert mechanism in a possible embodiment. An example of a routine extracted as one keyword 600, along with the weights vector 601, is illustrated for a time interval defined as the current morning. The distance vector 603 is computed as the distance between i) the keyword 600 extracted from the most dominant topic extracted for each time interval, and ii) the actual keyword 602, which is the absolute difference between the routine vector and the current levels vector for the current morning, as shown in FIG. 6.

Based on these, the alert measure is computed 604 and based on an identified threshold ($\sigma$), an alert is triggered 605 when this morning's sensor feature levels are too divergent from the extracted routine.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:

defining time intervals applicable to a user of a system for detecting abnormal behavior based on data from a sensor on a mobile phone indicative of usage patterns of the mobile phone by the user;

constructing words for each of the time intervals, wherein a word is constructed as a vector that includes one of the time intervals and a plurality of discrete sensor-based feature levels, wherein each of the discrete sensor-based feature levels is mapped to a range of values of a sensor-based feature that are extracted from the data from the sensor;

constructing a text document from the words based on the time intervals and the discrete sensor-based feature levels;

identifying a current routine for each of the time intervals by extracting the words that most frequently appear in the text document using topic modeling, wherein the current routine is characterized by the discrete sensor-based feature levels associated with each frequently appearing word; and generating an alert if the current routine for any of the time intervals deviates from a past routine determined based on a corresponding past time interval.

2. The method of claim 1, wherein the sensor-based feature is selected from the group consisting of: a percentage of time that the user spends at a particular location, a percentage of battery power of the mobile phone consumed per minute, a number of steps taken by the user per minute as sensed by the mobile phone, and an average ambient light level determined using the sensor.

3. The method of claim 1, wherein each of the discrete sensor-based feature levels is mapped to the values of the sensor-based feature based on the values of the sensor-based feature computed during each of the time intervals, and wherein a value of the sensor-based feature during a current time interval is compared to the values of the sensor-based feature associated with the remainder of the time intervals.

4. The method of claim 1, wherein the constructing the text document from the words involves grouping the words constructed from data acquired during a particular day of the week.

5. The method of claim 1, wherein the topic modeling involves Latent Dirichlet Allocation (LDA).

6. A method for detecting abnormal human behavior, comprising:
   preprocessing data including:
      defining time intervals applicable to a user based on historical data from sensors;
      personalizing the time intervals based on data actively input by the user or real-time data from the sensors;
      constructing words for each of the time intervals, wherein a word is constructed as a vector that includes one of the time intervals and a plurality of discrete sensor-based feature levels, wherein each of the discrete sensor-based feature levels is mapped to a range of values of a sensor-based feature that are extracted from the data from the sensors; and
      constructing a text document from the words based on the time intervals and the discrete sensor-based feature levels;
   extracting a routine for each of the time intervals by extracting the words that most frequently appear in the text document using topic modeling to obtain a routine vector; and
   generating an alert if the routine extracted in a current time interval deviates from a past routine extracted for a past time interval prior to the current time interval.

7. The method of claim 6, wherein the constructing of the words for each of the time intervals comprises:
   computing a plurality of sensor-based features by aggregating the data from the sensors; and
   assigning each of the discrete sensor-based feature levels to a corresponding sensor-based feature based on the value of each sensor-based feature computed during each of the time intervals and comparing said value with the values of the sensor-based feature computed for the remainder of the time intervals.

8. The method of claim 7, wherein an order of the plurality of sensor-based features is preserved in the routine vector constructed for each of the time intervals.

9. The method of claim 7, wherein the plurality of sensor-based features are computed as aggregated features extracted from the sensors that are disposed on a mobile phone or on a wearable device.

10. The method of claim 6, wherein the sensor-based feature is selected from the group consisting of: a percentage of time that the user spends at a predetermined location, a percentage of battery power consumed per minute, a number of steps taken by the user per minute, and an average ambient light level.

11. The method of claim 6, wherein the constructing the text document from the words involves grouping the words in a manner selected from the group consisting of:
   grouping the words constructed during a particular day of the week;
   grouping the words constructed during a particular day and during a particular one of the time intervals; and
   grouping the words constructed during a predetermined type of day and during the particular one of the time intervals.

12. The method of claim 6, wherein the extracting of routines uses topic modeling selected from the group consisting of: Latent Dirichlet Allocation (LDA) performed using Bag of Words, LDA using TF-IDF, Latent Semantic Analysis (LSA), Probabilistic Latent Semantic Analysis (PLSA), and LDA in Deep Learning (Ida2Vec).

13. The method of claim 6, wherein the extracting of routines uses Latent Dirichlet Allocation (LDA) performed using Bag of Words and comprises:
   creating a dictionary by indexing the words that are unique;
   encoding a bag of words by mapping each of the words to an index of the dictionary and to an order in which each of the words appears in the text document; and
   extracting topics from the text document by applying LDA to the encoded bags of words, wherein the routines for each of the time intervals are extracted based on the topics that are dominant.

14. The method of claim 6, wherein the generating of the alert comprises:
   computing a distance d between the routine vector extracted for each of the time intervals and a current level vector, wherein the current level vector is constructed based on the discrete sensor-based feature levels mapped to the range of values of each sensor-based feature extracted from the data from the sensors;
   assigning a weight w indicative of how well each sensor-based feature correlates to a predetermined target feature;
   computing an alert measure a:

$$a = \Sigma_i^n w_i * d_i$$

where i=1, 2, . . . , n, n representing how many sensor-based features were extracted from the real-time data from the sensors, the weight $w_i$ representing how well the sensor-based feature i correlates with the target feature, and the distance $d_i$ representing the distance between a discrete current level of the current level vector and the discrete sensor-based feature level of the sensor-based feature i;
   comparing the alert measure a with a predetermined threshold value; and
   triggering the alert when the alert measure a is greater than the predetermined threshold value.

15. A system for detecting abnormal human behavior, the system comprising:
   a memory that stores computer-readable code; and
   a processor operatively coupled to the memory, wherein the processor is configured to implement the computer-readable code to:
      define time intervals applicable to a user based on historical data from sensors;
      personalize the time intervals based on data actively input by the user or real-time data from the sensors;
      construct words for each of the time intervals, wherein a word is constructed as a vector that includes one of the time intervals and a plurality of discrete sensor-based feature levels, wherein each of the discrete sensor-based feature levels is mapped to a range of values of a sensor-based feature that are extracted from the data from the sensors;
      construct a text document from the words based on the time intervals and the discrete sensor-based feature levels;

extract routines for each of the time intervals by extracting the words that most frequently appear in the text document using topic modeling to obtain a routine vector, wherein the routines are characterized by the discrete sensor-based feature levels associated with the most frequently appearing words; and generate an alert if the sensor-based feature extracted in a current time interval deviates from a past routine extracted for a past time interval prior to the current time interval.

16. The system of claim 15, further comprising:
a graphical user interface on which the user is presented with a visualization of information selected from the group consisting of: the routine vector, the alert, the time intervals, and the historical data.

17. The system of claim 15, wherein the processor is further configured to extract the sensor-based feature from the data from the sensors, and wherein the sensors are disposed on a mobile phone or on a wearable device.

18. The system of claim 15, wherein the sensor-based feature is selected from the group consisting of: a percentage of time spent that the user spends at a predetermined location, a percentage of battery power consumed per minute, a number of steps taken by the user per minute, and an average ambient light level.

19. The system of claim 15, wherein the topic modeling is selected from the group consisting of: Latent Dirichlet Allocation (LDA) performed using Bag of Words, LDA using TF-IDF, Latent Semantic Analysis (LSA), Probabilistic Latent Semantic Analysis (PLSA), and LDA in Deep Learning (Ida2Vec).

* * * * *